(12) United States Patent
Far

(10) Patent No.: US 10,977,805 B2
(45) Date of Patent: Apr. 13, 2021

(54) CLOUD SERVER-BASED MICE INTELLIGENT MONITORING SYSTEM AND METHOD

(71) Applicant: Malogic Holdings Limited, Guangdong (CN)

(72) Inventor: Eliza Wong Ping Far, Shanghai (CN)

(73) Assignee: Malogic Holdings Limited, Guangdong (CN)

( * ) Notice: Subject to any disclaimer, the term of this patent is extended or adjusted under 35 U.S.C. 154(b) by 73 days.

(21) Appl. No.: 16/325,106

(22) PCT Filed: Dec. 27, 2018

(86) PCT No.: PCT/CN2018/124463
§ 371 (c)(1),
(2) Date: Feb. 12, 2019

(87) PCT Pub. No.: WO2019/144762
PCT Pub. Date: Aug. 1, 2019

(65) Prior Publication Data
US 2019/0392588 A1 Dec. 26, 2019

(30) Foreign Application Priority Data
Jan. 25, 2018 (CN) .......................... 201810073613.6

(51) Int. Cl.
*G06T 7/246* (2017.01)
*G06T 7/77* (2017.01)
(Continued)

(52) U.S. Cl.
CPC ............... *G06T 7/246* (2017.01); *G06T 7/77* (2017.01); *G08B 21/18* (2013.01); *H04N 7/181* (2013.01);
(Continued)

(58) Field of Classification Search
None
See application file for complete search history.

(56) References Cited

U.S. PATENT DOCUMENTS

2008/0295582 A1* 12/2008 Lee .......................... G01N 25/72
73/74
2018/0012460 A1* 1/2018 Heitz, III ......... G08B 13/19684

FOREIGN PATENT DOCUMENTS

| CN | 104159071 A | * | 11/2014 | ............... G06K 9/62 |
| CN | 204582233 U | * | 8/2015 | |

(Continued)

*Primary Examiner* — Jiangeng Sun
(74) *Attorney, Agent, or Firm* — Harness, Dickey & Pierce, P.L.C.; Anthony G. Fussner

(57) ABSTRACT

The invention relates to cloud server-based mice intelligent monitoring system and method, the system comprises a thermal infrared camera device, an intelligent terminal and a cloud server connected in sequence, and the thermal infrared camera device monitors activity track of a mouse by using thermal infrared sensing technology and camera technology, and sends monitored video frames to the intelligent terminal; the intelligent terminal discriminates moving object, records the current video frame and marks motion track, and transmits a video segment with the motion track to the cloud server; the cloud server recognizes the moving mouse and stores the current video segment, and marks mouse position and motion trajectory in the current video segment, and then aggregates and analyzes data to obtain relevant parameter information of the moving mouse to realize the intelligent monitoring of the mouse. The system uses the intelligent terminal to roughly identify moving mouse and coordinate with the cloud server to accurately identify the moving mouse. It then realizes the intelligent monitoring of the mouse, detects and helps to control the mice problem early, reduces unnecessary losses, reduces labor costs and improves monitoring efficiency.

17 Claims, 6 Drawing Sheets

(51) Int. Cl.
*G08B 21/18* (2006.01)
*H04N 7/18* (2006.01)

(52) U.S. Cl.
CPC ............... *G06T 2207/10016* (2013.01); *G06T 2207/10048* (2013.01); *G06T 2207/20081* (2013.01)

(56) References Cited

FOREIGN PATENT DOCUMENTS

| | | | | |
|---|---|---|---|---|
| CN | 108062349 A | * | 5/2018 | |
| CN | 110502919 A | * | 11/2019 | |
| WO | WO-2016004673 A1 | * | 1/2016 | ............... G06K 9/62 |

* cited by examiner

CLOUD SERVER-BASED MICE INTELLIGENT MONITORING SYSTEM AND METHOD

This patent application is a U.S. national stage filing under 35 U.S.C. § 371 of International Application No. PCT/CN2018/124463 filed Dec. 27, 2018, which claims priority to and the benefit of Chinese patent application No. 201810073613.6 filed Jan. 25, 2018. The disclosures of the applications identified in this paragraph are incorporated herein by reference in their entirety.

TECHNICAL FIELD

The invention relates to a field of intelligent monitoring technologies, in particular to cloud server-based mice intelligent monitoring system and method.

BACKGROUND

Mice are vectors for the occurrence and prevalence of many diseases. It can spread plague, epidemic hemorrhagic fever, leptospirosis and other diseases, which can cause serious harm to humans. It is very important to prevent mice. Mice are animals that breed very fast and are highly viable in mammals. They move quickly, are numerous, are widely distributed, and migrate frequently. And they usually come out at night and when there are few people. Their activity routes are variable, usually in three-dimensional mode. Therefore, the current manual hunting mice is labor-intensive and inefficient. Other rodent-killing methods, such as physical rodent control, usually deploy mousetraps and are inefficient due to the ambiguous movement of the mice; Chemical rodent control, which usually uses drugs to kill mice, is prone to safety hazards in areas such as kitchens where food is stored, so it is not recommended. In summary, the rodent control methods in the prior art are used after the occurrence of mice. Often, after discovering the damaged scene the next day, people knew that mice had appeared before the night. Mice are rarely able to be detected early. It is even more difficult to see the activity tracks of the mice, resulting in no further action and effective measures to prevent it, which caused unnecessary losses to customers.

SUMMARY

The present invention provides a cloud server-based mice intelligent monitoring system, in view of various problems existing in the prior art, such as artificial hunting mice, mousetraps, or drug poisoning which are performed after the damage of mice has occurred. The system uses camera technology and thermal infrared sensing technology to effectively monitor the movement tracks of mice, and uses the intelligent terminal to roughly identify the moving mice and accurately identify the moving mice in combination with the cloud server, and perform data aggregation and analysis and further reminders. The invention also relates to a cloud server-based mice intelligent monitoring method.

The technical solution of the present invention is as follows:

A cloud server-based mice intelligent monitoring system, wherein it comprises a thermal infrared camera device, an intelligent terminal and a cloud server connected in sequence, The thermal infrared camera device monitors activity track of a mouse by using thermal infrared sensing technology and camera technology, and sends monitored video frames to the intelligent terminal; the intelligent terminal discriminates moving object by artificial intelligence algorithm, records the current video frame and marks motion tracks, and transmits a video segment including the motion tracks to the cloud server; the cloud server identifies the moving mice in the video segment including the motion tracks by using another artificial intelligence algorithm, stores the current video segment and marks mice locations and motion tracks in the current video segment, then performs the process of data aggregation and analysis on the locations and motion tracks of the mice to obtain relevant parameter information on the mouse activity, thereby realizing the intelligent monitoring of the mice.

Further, the intelligent terminal performs a deep learning by using a moving target detection algorithm to identify a moving object; the cloud server uses an image recognition algorithm and a continuous motion stitching algorithm to identify moving mice in the video segments including the motion tracks.

Further, the thermal infrared camera device includes at least one set of thermal infrared cameras including a plurality of thermal infrared cameras, the number of the intelligent terminals corresponding to the number of sets of thermal infrared cameras, and the intelligent terminals being connected to the respective thermal infrared cameras of the corresponding sets of thermal infrared cameras; the cloud server is also used to manage entire monitoring network, and a plurality of intelligent terminals implement data sharing and/or data download through the cloud server.

Further, the system also includes an alarm device, and the alarm device is connected to the cloud server and the alarm device is provided with an alarm threshold, the alarm device activates an alarm function when the relevant parameter information on the mouse activity obtained by the cloud server through a process of data aggregation and analysis exceeds the corresponding alarm threshold.

Further, the system also includes a visual dashboard, and the visual dashboard is connected to the cloud server, the cloud server generates a report after obtaining the relevant parameter information on the mouse activity through the process of data aggregation and analysis, and displays the report on the visual dashboard;

Or, after obtaining the relevant parameter information on the mouse activity through the process of data aggregation and analysis, the cloud server generates a report and transmits the report back to the intelligent terminal, and the report is displayed through the human-machine interface of the intelligent terminal.

Further, the relevant parameter information on the mouse activity obtained by the cloud server includes frequency of occurrence of the mice, route of the motion tracks, active heatmap, time and/or quantity.

Further, the set of thermal infrared cameras includes two thermal infrared cameras, and the two thermal infrared cameras are respectively disposed oppositely at a center of two short sides of the rectangular monitoring space, the orientation of the thermal infrared camera is horizontal or slightly downward at a certain angle.

A cloud server-based mice intelligent monitoring method, wherein the method firstly monitors activity track of a mouse by using thermal infrared sensing technology and camera technology, and sends monitored video frames to an intelligent terminal; the intelligent terminal discriminates moving object by artificial intelligence algorithm, records the current video frame and marks the motion tracks, and transmits a video segment including the motion tracks to a cloud server; then the cloud server identifies the moving mice in the video segment including the motion tracks by using another artificial intelligence algorithm, stores the current video segment and marks mice locations and motion tracks in the current video segment, then performs the process of data aggregation and analysis on the locations and motion tracks of the mice to obtain relevant parameter information on the mouse activity, thereby realizing the intelligent monitoring of the mice.

Further, the method uses the intelligent terminal to perform a deep learning by using a moving target detection algorithm to identify a moving object; and uses the cloud server to use an image recognition algorithm and a continuous motion stitching algorithm to identify moving mice in the video segments including the motion tracks.

Further, after performing the process of data aggregation and analysis and obtaining the relevant parameter information on the mouse activity, the method updates the statistical data of mice, and starts an alarm function when the statistical data of mice exceeds preset alarm threshold;

And/or, after the cloud server performs the process of data aggregation and analysis and obtains relevant parameter information on the mouse activity, the method also generates a report and displays it through a visual dashboard, the relevant parameter information on the mouse activity obtained by the cloud server includes frequency of occurrence of the mice, route of the motion tracks, active heatmap, time and/or quantity.

The technical effects of the present invention are as follows:

The cloud server-based mice intelligent monitoring system provided by the invention is provided with a thermal infrared camera device, an intelligent terminal and a cloud server which are sequentially connected, the thermal infrared camera device uses thermal infrared sensing technology and camera technology to monitor activity tracks of mice. It uses the camera technology to realize 24-hour surveillance video in the space where mice often appear, and monitor, collect and track the activity traces of mice, and use thermal infrared sensing technology to effectively monitor the nighttime trajectory of mice; the intelligent terminal can store the monitoring video, identify the moving object through an artificial intelligence algorithm (such as the moving object detection algorithm for deep learning), record the current video frame and mark the movement tracks. That is, the moving target detection and real-time path tracking are perform by the intelligent terminal, so as to realize the real-time monitoring and the rough identification of mouse; the intelligent terminal transmits the video segment including the movement tracks to the cloud server, that is, the result of rough identification of the mouse is sent to the cloud server. After receiving the result from the intelligent terminal, the cloud server uses another artificial intelligence algorithm (such as an image recognition algorithm and a continuous motion stitching algorithm) to identify the moving mouse on the basis of the result and stores the current video segment, and marks the location and the movement tracks of the mice in the current video segment to finely identify the moving mouse. The cloud server then performs data aggregation and analysis on the locations and movement tracks of the mice to obtain relevant parameter information on the mouse activity, thereby realizing intelligent monitoring of the mice. The mice intelligent monitoring system of the invention utilizes a camera technology, a thermal infrared sensing technology, and uses a cloud server to manage the entire monitoring network. The invention adopts two-level data processing algorithms including the rough identification performed by the intelligent terminal and the fine identification performed by the cloud server, thereby reducing the burden on the cloud server. The cloud server only needs to further process the video segment including the movement tracks to determine whether there is really a moving mouse, and then perform data aggregation and analysis to make a reminder and help solve the problem. The system can accurately identify the mouse's activity tracks through artificial intelligence technology and through intelligent monitoring of the mice. That is, with this system, people can visually see the movement tracks of the mice, thereby being able to detect and control the effects of the mice early. This completely avoids the problems in the prior art that can only use the artificial hunting mouse, the mousetrap or the drug poisoning because of the inability to detect the trace of the mouse early, which is labor-intensive, inefficient, and has potential safety hazards. The system of the present invention can help a rodent control company or a commercial organization to develop a rodent control strategy in order to take targeted rodent control measures to effectively capture mice. The system of the invention can reduce unnecessary losses and realize intelligent monitoring, thereby reducing labor costs, being safe and reliable, and improving monitoring efficiency.

Preferably, the thermal infrared camera device comprises at least one set of thermal infrared cameras comprising a number of thermal infrared cameras. The number of intelligent terminals corresponds to the number of sets of the thermal infrared cameras and the intelligent terminals are connected to the respective thermal infrared cameras in the corresponding sets of thermal infrared cameras. That is to say, a set of thermal infrared cameras and one intelligent terminal can be used, or multiple sets of thermal infrared cameras and a plurality of corresponding intelligent terminals can be used, at this time, for example, a set of thermal infrared cameras are provided in each monitoring space, and each intelligent terminal is connected to the cloud server to form a multi-level monitoring network, and the entire monitoring network is centrally managed by the cloud server, so as to realize the separate processing and centralized management of data sent from each intelligent terminal, and realize the data sharing and/or data download. The use of cloud servers has greatly increased the storage capacity, the number of thermal infrared cameras has also increased greatly, the monitoring space has been wider, and the monitoring efficiency has been improved.

The plurality of thermal infrared cameras in the set of thermal infrared cameras can include two thermal infrared cameras. The two thermal infrared cameras can be arranged opposite each other at the center of the two short sides of the rectangular monitoring space, and the orientation of the thermal infrared camera is horizontal or slightly downward at a certain angle. In this way, for a rectangular monitoring space with a small area, it is possible to use as few thermal infrared cameras as possible to cover the wall, the ground, and the roof to the greatest extent, and the dead angle is small.

The invention also relates to a cloud server-based mice intelligent monitoring method. The method corresponds to the above-described cloud server-based mice intelligent monitoring system of the present invention. This method can be understood as a method of implementing the cloud server-based mice intelligent monitoring system described above. The method uses camera technology and thermal infrared sensing technology to monitor and track the activity traces of mice. According to the two-level data processing algorithm in which the intelligent terminal is used for rough identification and the cloud server is used for fine identification, the data is summarized, processed and analyzed by the cloud server finally to obtain the relevant parameter information on the mouse activity. And the report can be further formed to realize the intelligent monitoring of the mice. Warnings can also be issued based on the results of the data analysis process, to remind the staff to take targeted and effective rodent control measures so as to timely discover and prevent the scale of rodent from further expanding, thereby effectively reducing and preventing the occurrence of rodents and avoiding property damage caused by rodents. At the same time, it also saves the manpower and material resources of the catching mice, improves the efficiency of the catching mice.

Figure 1:
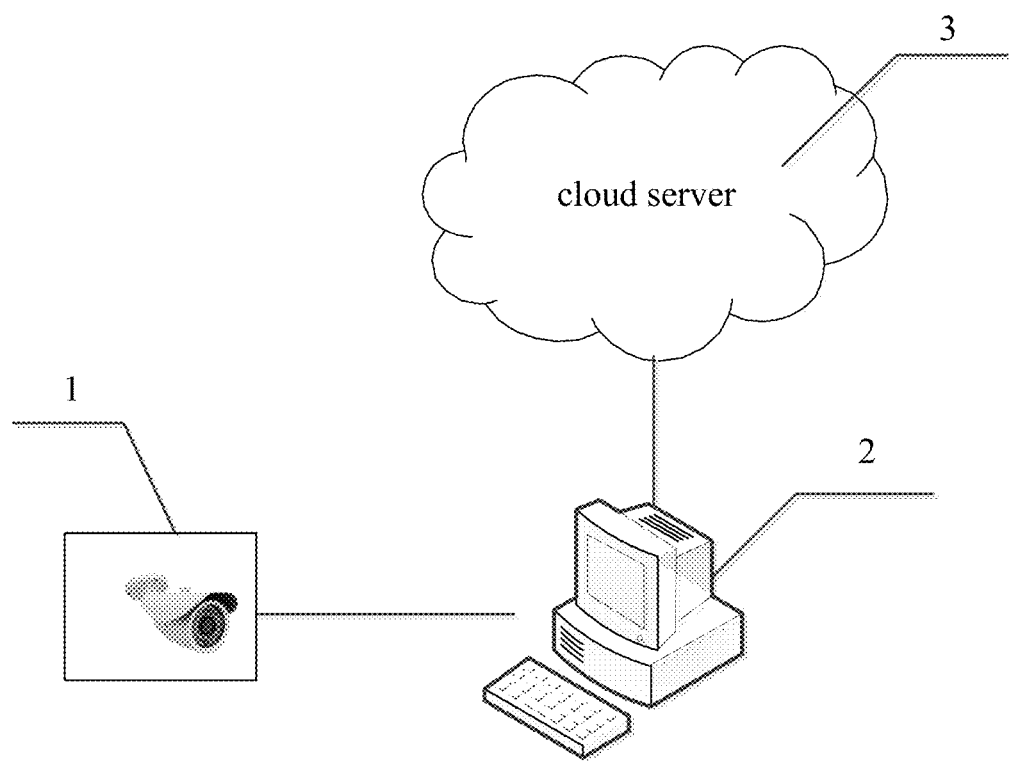
FIG. 1 is a schematic structural diagram of a cloud server-based mice intelligent monitoring system according to the present invention.

The reference numerals in the figs are listed as follows:
1—thermal infrared camera device; 11—thermal infrared camera; 2—intelligent terminal; 3—cloud server; 4—visual dashboard.

DESCRIPTION OF EXEMPLARY EMBODIMENTS

The invention will now be described with reference to the accompanying drawings.

The invention relates to a cloud server-based mice intelligent monitoring system. The structure of the system is shown in FIG. 1. The system includes a thermal infrared camera device 1, an intelligent terminal 2 and a cloud server 3 that are sequentially connected, wherein, the thermal infrared camera device 1 monitors the motion tracks of the mice by using the thermal infrared sensing technology and the camera technology and transmits video frames obtained by the monitoring to the intelligent terminal 2. The intelligent terminal 2 discriminates the moving object by an artificial intelligence algorithm, records the current video frame and marks the motion tracks, and transmits video segment including the motion tracks to the cloud server 3. The cloud server 3 identifies the moving mice in the video segment including the movement tracks by using another artificial intelligence algorithm, stores the current video segment and marks the mice locations and motion tracks in the current video segment. The cloud server 3 then performs the process of data aggregation and analysis on the locations and motion tracks of the mice to obtain relevant parameter information on the mouse activity, thereby realizing the intelligent monitoring of the mice.

The thermal infrared camera device 1 monitors the movement tracks of the mice by using the thermal infrared sensing technology and the camera technology. Therefore, the thermal infrared camera device 1 can be understood as a component that integrates a camera and a pyroelectric infrared sensor. It can achieve 24-hour surveillance video through camera in the main range of activities of the mice. It can monitor the timing, the number of times, the key areas of activity, and the change in trend of the mouse activity. It can monitor, collect and track the movement tracks of mice and can effectively monitor the mice' nocturnal trajectory using the pyroelectric infrared sensors. The thermal infrared camera device 1 transmits the video frames obtained by the monitoring to the intelligent terminal 2.

Figure 4:
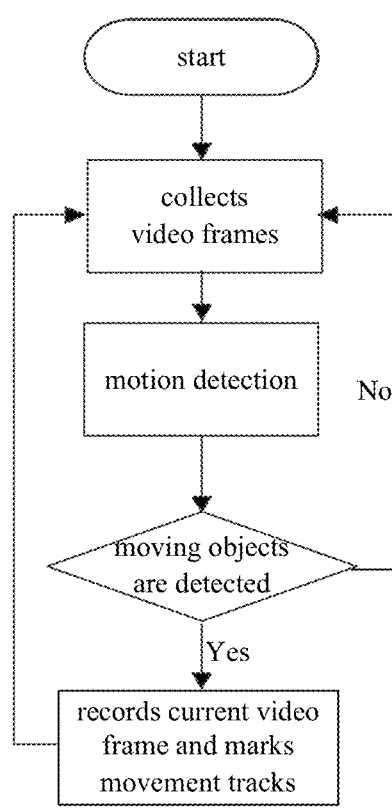
FIG. 4 is an operation principle diagram of the intelligent terminal.

The operation principle of the intelligent terminal 2 is as shown in FIG. 4. The intelligent terminal 2 collects and receives video frames from the thermal infrared camera device 1, and then performs the motion detection. The intelligent terminal 2 employs an artificial intelligence algorithm, and the algorithm preferably includes a moving target detection algorithm and a deep learning algorithm. Specifically, the intelligent terminal 2 performs the deep learning by using the moving target detection algorithm in combination with the deep learning algorithm to identify the active objects (or moving objects). The moving objects may be mice or other moving objects. Upon detecting the moving objects, the intelligent terminal 2 records the current video frame and marks the movement tracks, and continues to collect and receive the video frame from the thermal infrared camera device 1, and continues to perform subsequent steps such as motion detection, and finally obtains the video segment including the movement tracks. When no moving object is detected, the intelligent terminal 2 also returns the rest of video frames collected and received from the thermal infrared camera device 1. The intelligent terminal 2 is used to store the surveillance video, perform real-time monitoring, and roughly identify the mice. Specifically, the intelligent terminal 2 may be a PC, a laptop, a mobile phone, or a PAD. The intelligent terminal 2 can adopt other artificial intelligence algorithms or artificial intelligence technologies capable of real-time moving target detection and real-time path tracking, and finally transmit the video segment including the movement tracks to the cloud server 3.

Figure 5:
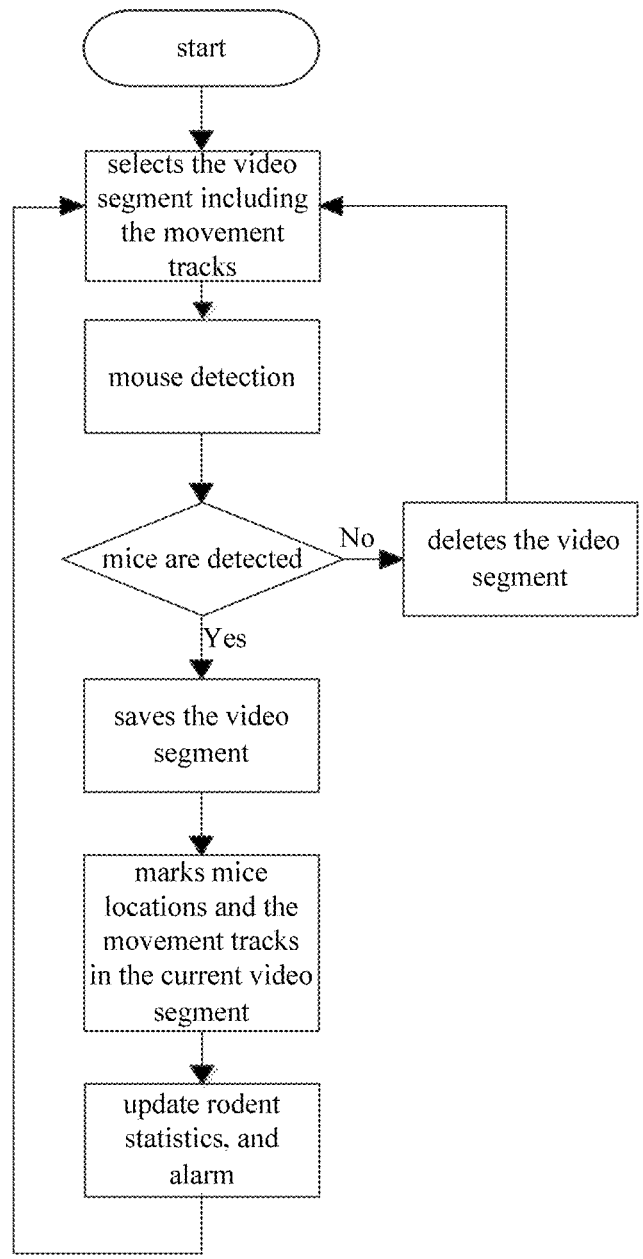
FIG. 5 is an operation principle diagram of the cloud server.

The operation principle of the cloud server 3 is as shown in FIG. 5. The cloud server 3 receives the video segment including the movement tracks, or selects the video segment including a movement area and the movement tracks, and then performs mouse detection. The cloud server 3 employs another artificial intelligence algorithm, preferably including an image recognition algorithm and a continuous motion stitching algorithm. Specifically, the cloud server 3 can exclude in advance the interference of dust and the light reflection of other items, perform the size filtering and the color filtering through an image recognition algorithm, and identify the mice by the image recognition algorithm in connection with other characteristics of the mice. In general, mice are usually 5 cm to 20 cm in size. The color of the mouse is usually gray, black or white. The image recognition algorithm can identify the mice by excluding other moving objects other than the mice according to the characteristics of the mice. The image recognition algorithm can identify the motion pattern of the mice in combination with the continuous motion stitching algorithm. Thus the combination of these two algorithms can identify moving mice. The cloud server 3 saves the current video segment when the mice are detected, deletes the video segment and returns when the mice are not detected, and proceeds to select next video segment including the motion area and the movement tracks to continue the mouse detection. After detecting the mice and saving the video segment, the cloud server 3 marks the locations and the movement tracks of mice in the current video segment, and then performs the process of data aggregation and analysis on the locations and the movement tracks of mice to obtain the relevant parameter information on the mouse activity. The cloud server 3 can update the rodent statistics and also can further alarm. The cloud server 3 then returns to select next video segment including the motion area and the movement tracks to continue the mouse detection, thereby the intelligent monitoring of the mice is implemented. Of course, the cloud server 3 can also adopt other artificial intelligence algorithms or artificial intelligence technologies that can accurately identify the moving mice. The cloud server 3 is used to manage the entire monitoring network, perform the fine identification of the mice, perform the data aggregation, processing, analysis, and further form a report.

Figure 2:
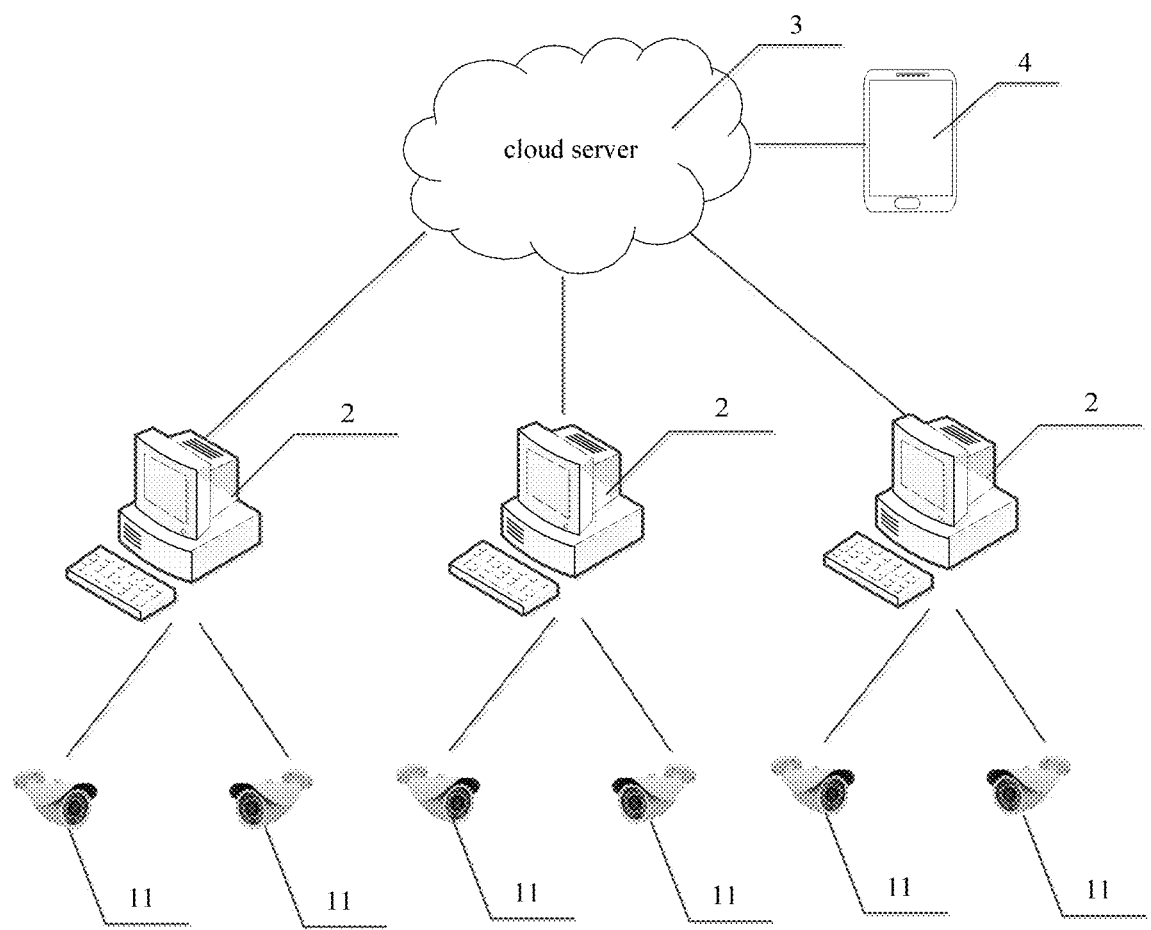
FIG. 2 is a schematic diagram of a preferred structure of the cloud server-based mice intelligent monitoring system according to the present invention.

Preferably, the thermal infrared camera device 1 may include at least one set of thermal infrared cameras including a plurality of thermal infrared cameras 11. The number of intelligent terminals corresponds to the number of sets of the thermal infrared cameras and the intelligent terminals are connected to the respective thermal infrared cameras 11 in the corresponding sets of thermal infrared cameras. FIG. 2 is a schematic diagram showing the preferred structure of the cloud server-based mice intelligent monitoring system according to the present invention. In the preferred embodiment, the thermal infrared camera device 1 includes three sets of thermal infrared cameras, and each set of thermal infrared cameras includes two thermal infrared cameras 11. Accordingly, three intelligent terminals 2 are also provided. Each intelligent terminal 2 is connected to the respective thermal infrared cameras 11 in the corresponding sets of thermal infrared cameras. Each of the three intelligent terminals 2 is connected to the cloud server 3. The mice intelligent monitoring system shown in FIG. 2 further includes a visual dashboard 4 connected to the cloud server 3. After obtaining the relevant parameter information on the mouse activity through the process of data aggregation and analysis, the cloud server 3 generates a report and displays the report on the visual dashboard 4. The visual dashboard 4 can be accessed in a mobile phone, a computer or a tablet. Of course, instead of providing the visual dashboard 4 via other terminals, the cloud server 3 may generates the report after the relevant parameter information on the mouse activity has been obtained by the process of data aggregation and analysis, and transmits the report to the intelligent terminal 2. The report is then displayed on the human machine interface of the intelligent terminal 2. Further preferably, the cloud server-based mice intelligent monitoring system according to the present invention may further comprise an alarm device. The alarm device is connected to the cloud server and the alarm device is provided with an alarm threshold. If the relevant parameter information on the mouse activity obtained by the cloud server through the process of data aggregation and analysis exceeds the corresponding alarm threshold, the alarm device activates the alarm function, thereby preventing mouse damage before the occurrence of the mouse damage to reduce the unnecessary losses. A plurality of sets of thermal infrared cameras and a plurality of corresponding intelligent terminals 2 are provided. At this time, for example, each monitoring space is equipped with a set of thermal infrared cameras. Each intelligent terminal 2 is connected to the cloud server 3. Thereby a multi-level monitoring network is formed. By centrally managing the entire monitoring network by the cloud server 3, the separate processing and centralized management of data sent by each intelligent terminal 2 can be realized, and the data sharing and/or data downloading can be realized.

Figure 3A:
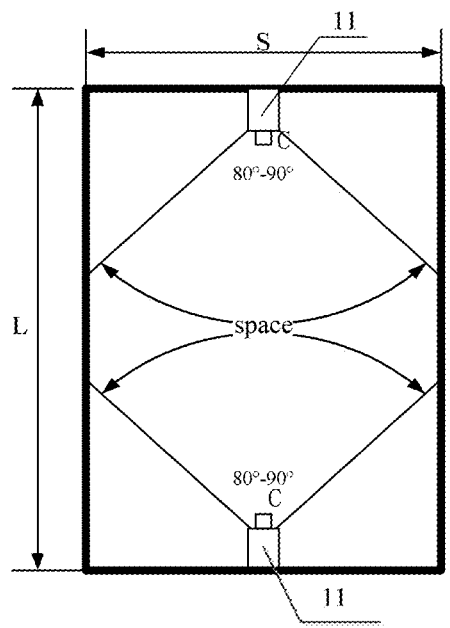
FIGS. 3a and 3b are respectively a top view and a side view of a preferred installation of the thermal infrared camera device in the mice intelligent monitoring system of the present invention.
Figure 3B:
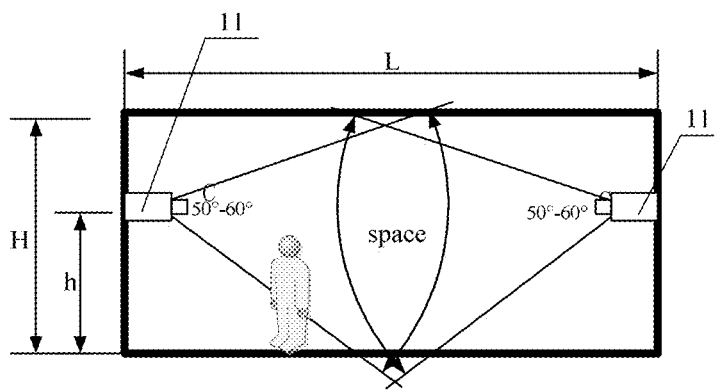

The monitoring space can be a room, such as a kitchen where mice often appear. The preferred installation and deployment scheme of the thermal infrared camera device will be described below. A minimum number of thermal infrared cameras should be used to maximize coverage of walls, floors, and roofs while ensuring fewer dead angles. FIGS. 3a and 3b show a top view and a side view, respectively, of a rectangular monitoring space. The long side of the rectangular monitoring space is L. The length of the space usually does not exceed 7 meters, i.e. L≤7 m. The short side is S. The space height is H. The set of thermal infrared cameras in the thermal infrared camera device 1 includes two thermal infrared cameras 11. Preferably, two thermal infrared cameras 11 are respectively disposed at the center of the two short sides S of the rectangular monitoring space to perform photographing in opposite directions. The orientation of the thermal infrared camera 11 can be horizontal or slightly downward at a certain angle. At this time, in FIG. 3a, the horizontal angle C irradiated by the thermal infrared camera 11 is 80°-90°, and the monitoring space is formed between the opposite two thermal infrared cameras 11. In FIG. 3b, it can be seen that the heights of the two thermal infrared cameras 11 are set to h. Preferably, h is set to be about 2 meters. The vertical angle C illuminated by the thermal infrared camera 11 is 50°-60°. The monitoring space is formed between the two opposing thermal infrared cameras 11. This arrangement has only a very small dead angle at the upper end of the intersection of the vertical angles of the illumination of the two thermal infrared cameras 11 of FIG. 3b. The number of thermal infrared cameras 11 needs to be increased in irregular rooms and oversized rooms.

Thus, we performed the detection of the mouse activity by deploying the thermal infrared cameras 11. Through the recorded video, we can use the intelligent terminal 2 to know the number of times the mice enter the surveillance field, main active time, and key active area. According to the increase in the recording time, it is possible to know the daily/weekly/monthly changes in the activity trends and the movement tracks of the mice in the kitchen. And the motion detection rough recognition can intercept the video that may have mice, and transmit it to the cloud server 3 for further analysis. The cloud server 3 collects and analyzes the data, finely identifies the mice, and then issues a warning to help formulate a solution.

Figure 6A:
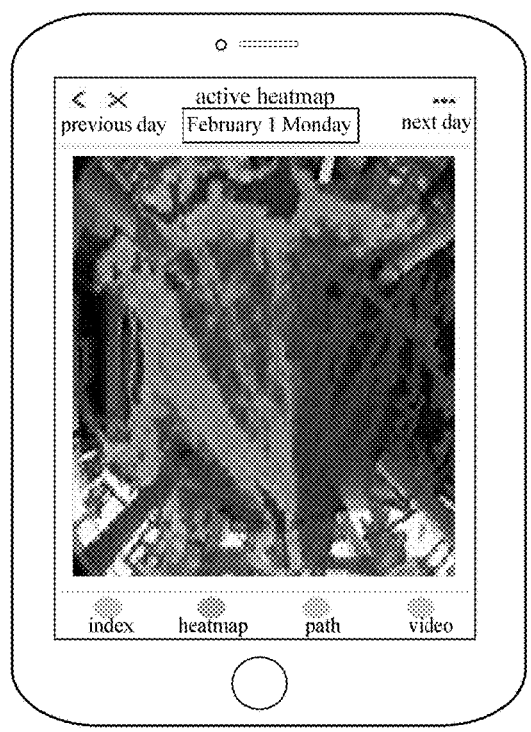
FIGS. 6a-6d are diagrams showing the relevant parameter information on the mouse activity obtained by the mice intelligent monitoring system of the present invention on the visualized dashboard.
Figure 6B:
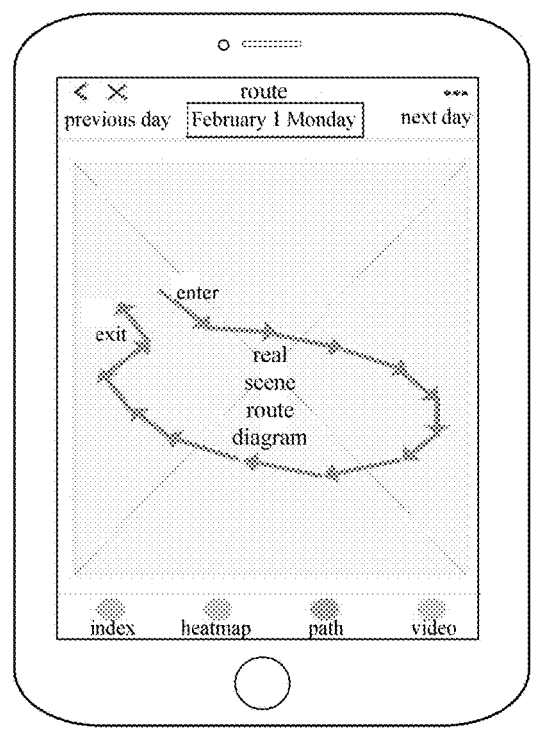
Figure 6C:
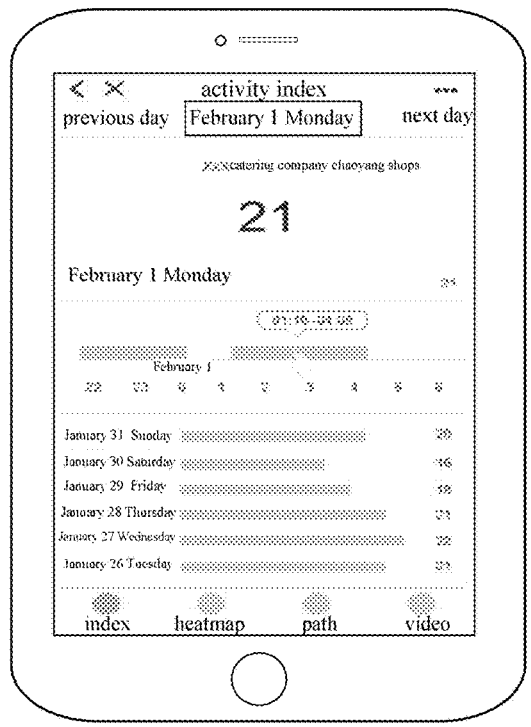
Figure 6D:
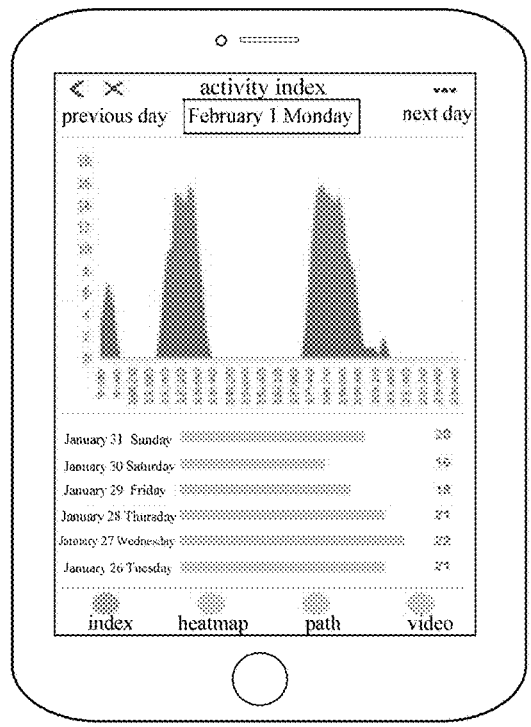

FIGS. 6a-6d are graphs showing the relevant parameter information on the mouse activity obtained by the mice intelligent monitoring system of the present invention on the visual dashboard. The cloud server performs the fine identification of the mice after the process of data aggregation and analysis to obtain the relevant parameter information on the mouse activity. This information may include frequency of occurrence of the mice, route of the motion tracks, time and quantity, and the like. That is to say, the occurrence of the mice (occurrence time, occurrence frequency, movement tracks, key activity area, trend change, quantity, etc. of the mice) was grasped and the characteristics of the mouse were marked. The cloud server can also display this information on the visual dashboard. The visual dashboard can show the index, heatmap, paths, and videos in detail. FIG. 6a shows the hot zone of the mouse's activity on a certain date, that is, the heatmap of occurrence of the mouse, which can be graded from a warm color to a cool color according to the frequency of occurrence of the mouse. The warmer color of the heatmap where the frequency of occurrence of the mouse is higher is deeper. The colder color of the heatmap where the frequency of occurrence of the mouse is lower is shallower. For example, the hot zone with the highest frequency of occurrence of the mouse is displayed in red, and the hot zone with the lowest frequency of occurrence of the mouse is displayed in blue. FIG. 6b shows the route of the mouse on that date. FIG. 6c shows the activity index of mice over the course of a week. Data can be updated at fixed time points each day. For example, data can be updated every day at 12 noon. FIG. 6c shows an active index updated, for example, on February 1. The activity index is calculated based on the data over 24 hours from 12 noon on January 31 to 12 noon on February 1. FIG. 6c shows the activity index of mice for the last 7 days. Only the recently updated 24-hour data is displayed in detail. The bar on the timeline is the mice appearing frequency in that time period. Further, if the bar of mice appearance is clicked, a pop-up dialog box will be displayed to show the specific time period. FIG. 6d shows the activity curve of mice for a specific time period.

After the data analysis of the cloud server, an alarm can be issued by the alarm device to help formulate a specific mouse control solution. The alarm function can be activated to set the condition of mice appearance. If the set condition is exceeded, the alarm function will automatically alarm, so that the mice can be caught in time to reduce unnecessary losses. In this way, the damage of mice is effectively reduced and prevented. The manpower and material resources needed to capture the mice are saved, and the mice can be captured more efficiently. At the same time, the system can also be used for monitoring different scenarios, such as customer satisfaction survey and service quality monitoring. The system has less intervention on the subjects to be observed and evaluated, and the results are more authentic and credible.

Figure 7:
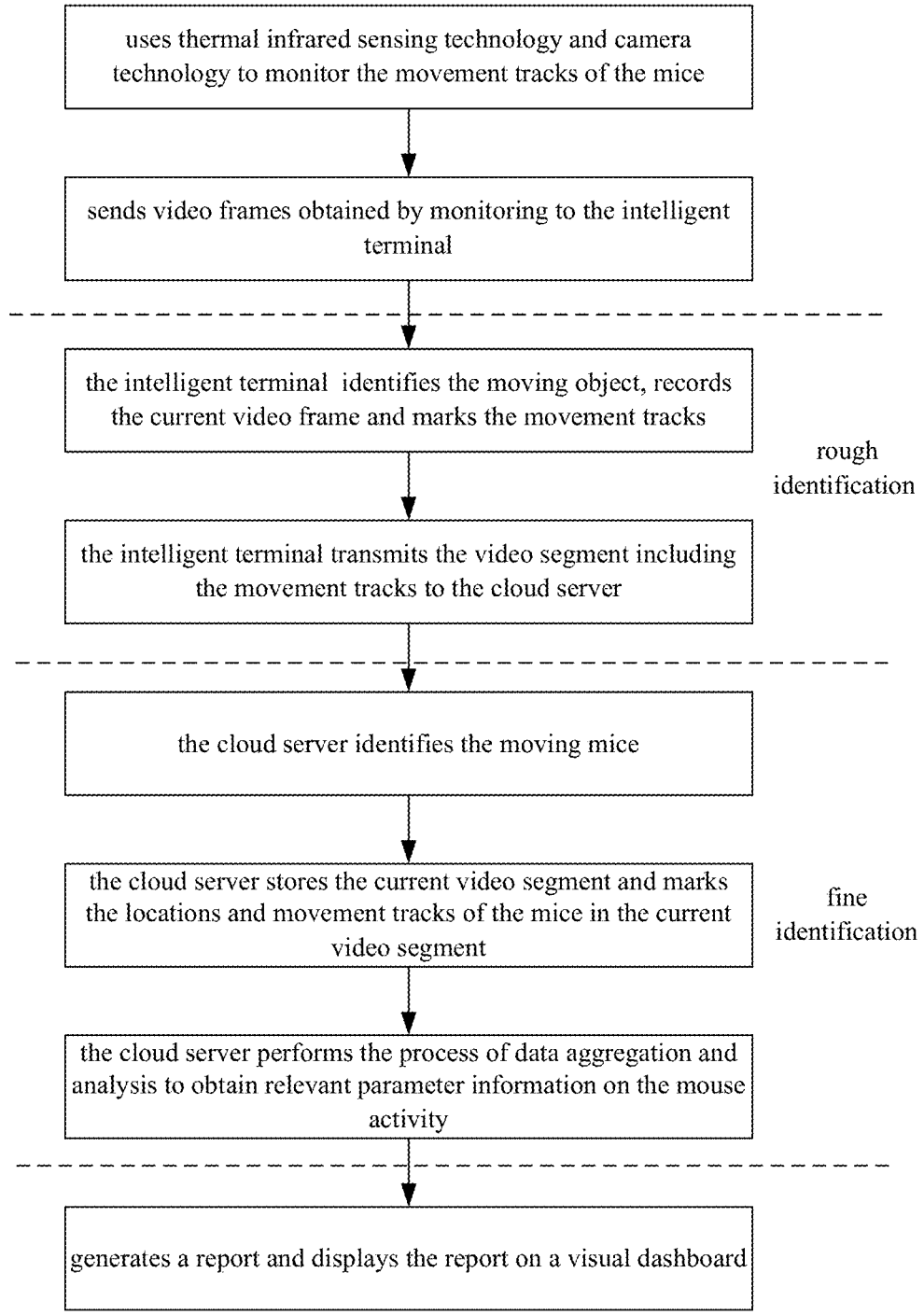
FIG. 7 is a preferred flowchart of a cloud server-based mice intelligent monitoring method according to the present invention.

The invention also relates to a cloud server-based mice intelligent monitoring method, which corresponds to the above-mentioned cloud server-based mice intelligent monitoring system of the present invention, and can be understood as a method for implementing the above-mentioned cloud server-based mice intelligent monitoring system. As shown in the preferred flowchart of FIG. 7, the method first uses thermal infrared sensing technology and camera technology to monitor the movement tracks of the mice and send the video frames obtained by monitoring to the intelligent terminal. Then, the intelligent terminal performs deep learning through an artificial intelligence algorithm such as a moving target detection algorithm to identify the moving object, records the current video frame and marks the movement tracks, and transmits the video segment including the movement tracks to the cloud server to roughly identify mice. Then, the cloud server identifies the moving mice in the video segment including the movement tracks by using another artificial intelligence algorithm such as the image recognition algorithm and the continuous motion stitching algorithm, stores the current video segment and marks the locations and movement tracks of the mice in the current video segment, so that the fine recognition of the mice is realized. The cloud server performs the process of data aggregation and analysis on the locations and movement tracks of the mice to obtain the relevant parameter information on the mouse activity, thereby realizing the intelligent monitoring of the mice. After performing the process of data aggregation and analysis and obtaining the relevant parameter information on the mouse activity, the cloud server can also generate a report and display the report on a visual dashboard. The obtained relevant parameter information on the mouse activity includes the frequency of occurrence of the mice, the route of the motion tracks, the time and/or the number of the movement tracks, and the like. Further preferably, after performing the process of data aggregation and analysis and obtaining the relevant parameter information on the mouse activity, the cloud server updates the statistical data of mice, and starts the alarm function when the statistical data of mice exceeds the preset alarm threshold.

The working principles of the intelligent terminal and the cloud server used in the cloud server-based mice intelligent monitoring method of the present invention can be respectively referred to FIG. 4 and FIG. 5. The mice intelligent monitoring method uses the camera technology and the thermal infrared sensing technology to monitor and track the activity traces of mice, and roughly recognizes them through the intelligent terminal: the moving object is discriminated by the moving target detection algorithm in connection with the deep learning algorithm, and the moving object may be a mouse or other target; finely identify in collaboration with the cloud server: for the discriminated moving object, the interference of dust and other items is excluded, the image recognition algorithm is used for size filtering and color filter in combination with other characteristics of the mice to identify the mice; and the movement pattern of the mice is identified in combination with the continuous motion stitching algorithm; with these two algorithms, the moving mice are eventually identified clearly. According to the two-level data processing algorithm in which the intelligent terminal is used for rough identification and the cloud server is used for fine identification, the data is summarized, processed and analyzed by the cloud server finally to obtain the relevant parameter information on the mouse activity. And the report can be further formed to realize the intelligent monitoring of the mice. Warnings can also be issued based on the results of the data analysis process. That is, early warning is implemented before the occurrence of rodent trouble, to remind the staff to take corresponding measures, thereby effectively reducing and preventing the occurrence of rodent trouble and avoiding property damage caused by rodents. At the same time, it also saves the manpower and material resources of mouse catching, improves the efficiency of the mouse catching, and is conducive to widespread application.

It should be noted that the above-described embodiments may enable those skilled in the art to more fully understand the present invention, but do not limit the invention in any way. Accordingly, the present invention has been described in detail with reference to the accompanying drawings and embodiments, and those skilled in the art will understand that the invention may be modified or substituted. In short, all technical solutions and improvements thereof that do not depart from the spirit and scope of the present invention should be covered by the scope of protection of the invention.

The invention claimed is:

1. A cloud server-based mice intelligent monitoring system, comprising a thermal infrared camera device, an intelligent terminal and a cloud server connected in sequence, the thermal infrared camera device monitors activity track of a mouse by using thermal infrared sensing technology and camera technology, and sends monitored video frames to the intelligent terminal; the intelligent terminal discriminates moving object by artificial intelligence algorithm, records the current video frame and marks motion tracks, and transmits a video segment including the motion tracks to the cloud server; the cloud server identifies the moving mice in the video segment including the motion tracks by using another artificial intelligence algorithm, stores the current video segment and marks mice locations and motion tracks in the current video segment, then performs the process of data aggregation and analysis on the locations and motion tracks of the mice to obtain relevant parameter information on the mouse activity, thereby realizing the intelligent monitoring of the mice.

2. The cloud server-based mice intelligent monitoring system according to claim 1, wherein the intelligent terminal performs a deep learning by using a moving target detection algorithm to identify a moving object; the cloud server uses an image recognition algorithm and a continuous motion stitching algorithm to identify moving mice in the video segments including the motion tracks.

3. The cloud server-based mice intelligent monitoring system according to claim 2, wherein the thermal infrared camera device includes at least one set of thermal infrared cameras including a plurality of thermal infrared cameras, the number of the intelligent terminals corresponding to the number of sets of thermal infrared cameras, and the intelligent terminals being connected to the respective thermal infrared cameras of the corresponding sets of thermal infrared cameras; the cloud server is also used to manage entire monitoring network, and a plurality of intelligent terminals implement data sharing and/or data download through the cloud server.

4. The cloud server-based mice intelligent monitoring system according to claim 1, wherein further including an alarm device, and the alarm device is connected to the cloud server and the alarm device is provided with an alarm threshold, the alarm device activates an alarm function when the relevant parameter information on the mouse activity obtained by the cloud server through a process of data aggregation and analysis exceeds the corresponding alarm threshold.

5. The cloud server-based mice intelligent monitoring system according to claim 4, wherein further including a visual dashboard, and the visual dashboard is connected to the cloud server, the cloud server generates a report after obtaining the relevant parameter information on the mouse activity through the process of data aggregation and analysis, and displays the report on the visual dashboard;
  Or, after obtaining the relevant parameter information on the mouse activity through the process of data aggregation and analysis, the cloud server generates a report and transmits the report back to the intelligent terminal, and the report is displayed through human-machine interface of the intelligent terminal.

6. The cloud server-based mice intelligent monitoring system according to claim 1, wherein the relevant parameter information on the mouse activity obtained by the cloud server includes frequency of occurrence of the mice, route of the motion tracks, active heatmap, time and/or quantity.

7. The cloud server-based mice intelligent monitoring system according to claim 2, wherein the set of thermal infrared cameras includes two thermal infrared cameras, and the two thermal infrared cameras are respectively disposed oppositely at a center of two short sides of the rectangular monitoring space, the orientation of the thermal infrared camera is horizontal or slightly downward at a certain angle.

8. A cloud server-based mice intelligent monitoring method, wherein the method firstly monitors activity track of a mouse by using thermal infrared sensing technology and camera technology, and sends monitored video frames to an intelligent terminal; the intelligent terminal discriminates moving object by artificial intelligence algorithm, records the current video frame and marks the motion tracks, and transmits a video segment including the motion tracks to a cloud server; then the cloud server identifies the moving mice in the video segment including the motion tracks by using another artificial intelligence algorithm, stores the current video segment and marks mice locations and motion tracks in the current video segment, then performs the process of data aggregation and analysis on the locations and motion tracks of the mice to obtain relevant parameter information on the mouse activity, thereby realizing the intelligent monitoring of the mice.

9. The cloud server-based mice intelligent monitoring method according to claim 8, wherein the method uses the intelligent terminal to perform a deep learning by using a moving target detection algorithm to identify a moving object; and uses the cloud server to use an image recognition algorithm and a continuous motion stitching algorithm to identify moving mice in the video segments including the motion tracks.

10. The cloud server-based mice intelligent monitoring method according to claim 8, wherein after performing the process of data aggregation and analysis and obtaining the relevant parameter information on the mouse activity, the method updates the statistical data of mice, and starts an alarm function when the statistical data of mice exceeds preset alarm threshold;
  And/or, after the cloud server performs the process of data aggregation and analysis and obtains relevant parameter information on the mouse activity, the method also generates a report and displays it through a visual dashboard, the relevant parameter information on the mouse activity obtained by the cloud server includes frequency of occurrence of the mice, route of the motion tracks, active heatmap, time and/or quantity.

11. The cloud server-based mice intelligent monitoring system according to claim 2, wherein further including an alarm device, and the alarm device is connected to the cloud server and the alarm device is provided with an alarm threshold, the alarm device activates an alarm function when the relevant parameter information on the mouse activity obtained by the cloud server through a process of data aggregation and analysis exceeds the corresponding alarm threshold.

12. The cloud server-based mice intelligent monitoring system according to claim 11, wherein further including a visual dashboard, and the visual dashboard is connected to the cloud server, the cloud server generates a report after obtaining the relevant parameter information on the mouse activity through the process of data aggregation and analysis, and displays the report on the visual dashboard;
  Or, after obtaining the relevant parameter information on the mouse activity through the process of data aggregation and analysis, the cloud server generates a report and transmits the report back to the intelligent terminal, and the report is displayed through human-machine interface of the intelligent terminal.

13. The cloud server-based mice intelligent monitoring system according to claim 3, wherein further including an alarm device, and the alarm device is connected to the cloud server and the alarm device is provided with an alarm threshold, the alarm device activates an alarm function when the relevant parameter information on the mouse activity obtained by the cloud server through a process of data aggregation and analysis exceeds the corresponding alarm threshold.

14. The cloud server-based mice intelligent monitoring system according to claim 13, wherein further including a visual dashboard, and the visual dashboard is connected to the cloud server, the cloud server generates a report after obtaining the relevant parameter information on the mouse activity through the process of data aggregation and analysis, and displays the report on the visual dashboard;

Or, after obtaining the relevant parameter information on the mouse activity through the process of data aggregation and analysis, the cloud server generates a report and transmits the report back to the intelligent terminal, and the report is displayed through human-machine interface of the intelligent terminal.

15. The cloud server-based mice intelligent monitoring system according to claim 2, wherein the relevant parameter information on the mouse activity obtained by the cloud server includes frequency of occurrence of the mice, route of the motion tracks, active heatmap, time and/or quantity.

16. The cloud server-based mice intelligent monitoring system according to claim 3, wherein the relevant parameter information on the mouse activity obtained by the cloud server includes frequency of occurrence of the mice, route of the motion tracks, active heatmap, time and/or quantity.

17. The cloud server-based mice intelligent monitoring method according to claim 9, wherein after performing the process of data aggregation and analysis and obtaining the relevant parameter information on the mouse activity, the method updates the statistical data of mice, and starts an alarm function when the statistical data of mice exceeds preset alarm threshold;

And/or, after the cloud server performs the process of data aggregation and analysis and obtains relevant parameter information on the mouse activity, the method also generates a report and displays it through a visual dashboard, the relevant parameter information on the mouse activity obtained by the cloud server includes frequency of occurrence of the mice, route of the motion tracks, active heatmap, time and/or quantity.

* * * * *